United States Patent
Yan et al.

(10) Patent No.: US 9,619,045 B1
(45) Date of Patent: Apr. 11, 2017

(54) USER INPUT SOURCE IDENTIFICATION BASED ON DELAYED INPUT

(71) Applicant: Amazon Technologies, Inc., Reno, NV (US)

(72) Inventors: Henry Chi-Chung Yan, Seattle, WA (US); Michael Keith Lemmon, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 220 days.

(21) Appl. No.: 14/263,767

(22) Filed: Apr. 28, 2014

(51) Int. Cl.
*G06F 3/00* (2006.01)
*G06F 3/023* (2006.01)
*G06F 3/0482* (2013.01)
*G06F 3/0489* (2013.01)

(52) U.S. Cl.
CPC ............ *G06F 3/023* (2013.01); *G06F 3/0482* (2013.01); *G06F 3/0489* (2013.01)

(58) Field of Classification Search
CPC .. G06Q 30/0243; G06F 3/0489; G06F 3/0482
See application file for complete search history.

(56) References Cited

U.S. PATENT DOCUMENTS

2014/0122220 A1* 5/2014 Bradley ............ G06Q 30/0243
705/14.42

* cited by examiner

*Primary Examiner* — Ernest Unelus
(74) *Attorney, Agent, or Firm* — Sutherland, Asbill & Brennan LLP

(57) ABSTRACT

Certain embodiments herein relate to determining a type of input device from which user input is received. Input devices, such as keyboards, scanners, card readers, other keypad devices, etc., may send information to a computing device. The information may include one or more characters or signals, each of which may be received by the computing device after a delay. Such a delay may be analyzed to determine a source or type of user input device. A threshold time may be established such that an identification and number of characters received before the threshold time is reached may be used to determine the source or type of an input device. In example embodiments, a distinction between a bar code scanner and a keyboard, among other types of input devices used in a product shipping application, may be determined.

20 Claims, 4 Drawing Sheets

USER INPUT SOURCE IDENTIFICATION
BASED ON DELAYED INPUT

BACKGROUND

Users may utilize various input devices, such as keyboards, scanners, etc., to input information into computing systems. Users who package products for shipping, for example, may utilize a keyboard to select menu options and may utilize a scanner to capture identifications associated with bar code labels or other identifiers on packages and products for shipping. Existing systems, however, may be unable to distinguish between various sources or types of user input, and therefore, may struggle to determine which functions to perform based on the user input.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items, however, various embodiments may utilize elements and/or components other than those illustrated in the figures.

DETAILED DESCRIPTION

Figure 1:
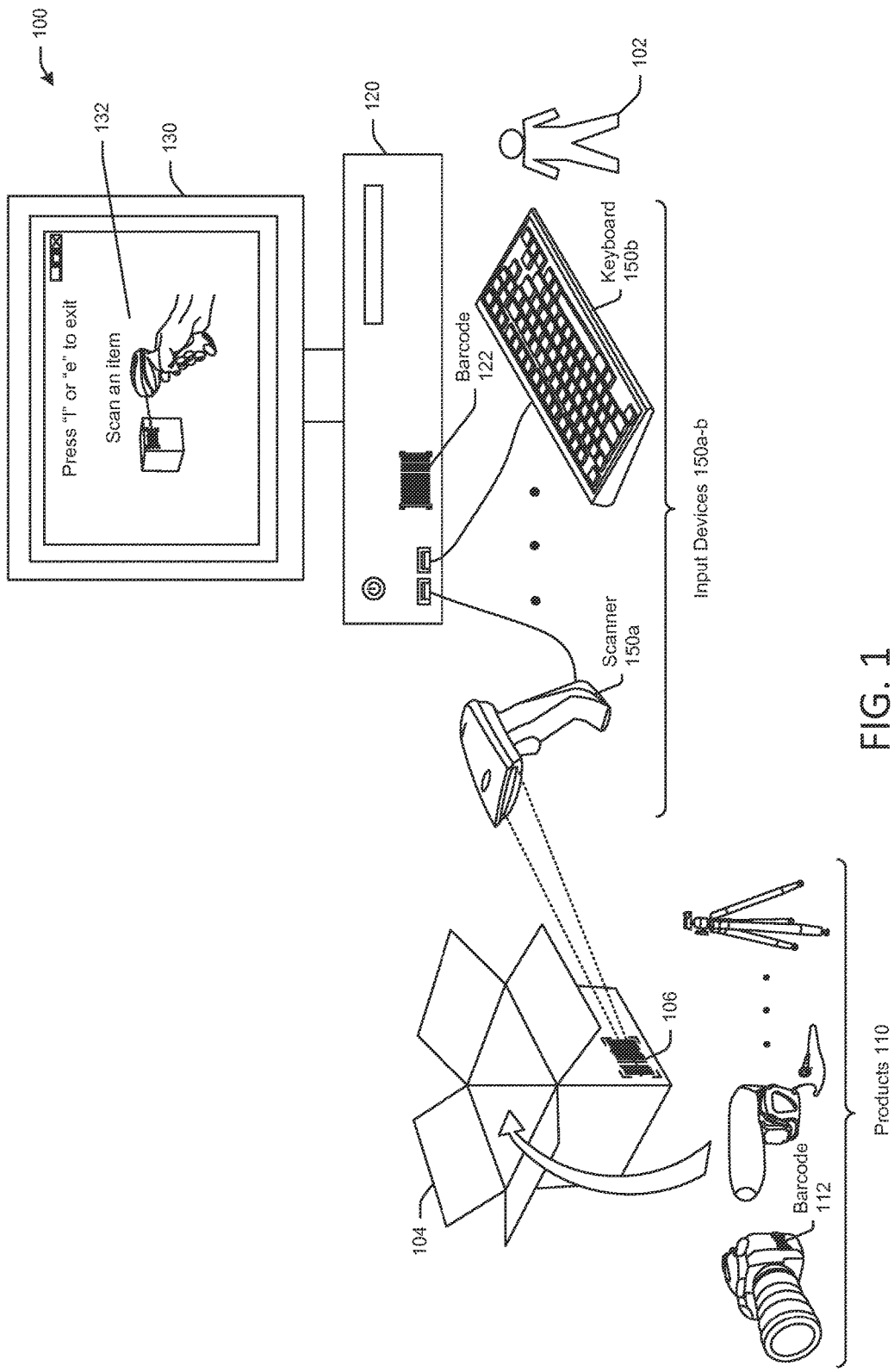
FIG. 1 illustrates a schematic diagram of an example system for identifying a source of user input associated with shipping a product, according to an embodiment of the disclosure.

Certain embodiments herein relate to, among other things, identifying a source of user input based on an input delay. Input devices, such as keyboards, scanners, card readers, other keypad devices, etc., may send information to a computing device. Such information may include one or more characters or signals, each of which may be received by the computing device after a delay. For example, sending information associated with a bar code that reads "xyz12345" may result in the computing device receiving the "x" at 1.0 milliseconds (ms), the "y" at 8.0 ms, the "z" at 18.0 ms, and so forth such that each character received by the computer device may be received at a different time, and hence, the existence of delayed input. Such a delay may be utilized to determine a source or type of user input device.

One source or type of input device may include a key press input device. A key press input device, as used herein, may include a keyboard or a similar device that includes a keypad for entering characters (e.g., ASCII characters) such as, but not limited to, various models of the Genovation Controlpad. A user may utilize a key press input device to select a hotkey, or a command character as used herein, to execute a particular function of a software application. In certain embodiments herein, such a software application may be a product shipping application that manages the process for packaging and shipping a product.

Another source or type of input device may include a data stream reader device. A data stream reader device, as used herein, may include a scanner or similar device that captures bar code information or other encoded data. A user may utilize a data stream reader device to scan a bar code label or a similar identifier affixed to a product or item to be shipped, as well as a tote, box, tray or other container in which the product or item may be enclosed.

Certain embodiments herein relate to determining the source or type of user input, or put another way, the source of an input device from which the user input is received, based on the information received from the input device. Such a determination may be based on an identity and number of characters in the received information. The determination may include analyzing a first character in the information to determine whether it is a command character. If the first character is a command character, then a process may be initiated to implement a delay until a threshold time is reached. Such a process may be a thread that runs concurrently with other processes that monitor and receive information from input devices.

After the threshold time is reached, a memory buffer in which characters received from an input device are stored may be analyzed to determine a number of characters in the buffer. If only one character exists in the buffer when the threshold time is reached, and the character was determined to be a command character as described above, then a determination may be made that the source or type of input device is a key press input device, such as a keyboard. If more than one character exists in the buffer, then a determination may be made that the source or type of the input device is a data stream reader device. Additional characters associated with a bar code or similar identifier may be received after such a determination, in one embodiment.

The threshold time may be set to facilitate the above determinations. For example, the threshold time may be predetermined based on historical delay times between characters received from data stream input devices. Such data may indicate that at least two characters are received before a certain time, which may be established as the threshold time. In this way, the threshold time may ensure that characters associated with a data stream reader device are not confused with characters associated with a key press input device. In some embodiments, the threshold time may be established based at least in part on system utilization, load, network latency, or other performance metrics associated with a computing device in communication with the input device.

The above descriptions are for purposes of illustration and are not meant to be limiting. Other descriptions, examples, embodiments, etc., may also exist, at least a portion of which are described in greater detail below.

FIG. 1 depicts a schematic diagram of an example system 100 for identifying a source of user input. In one embodiment, the user input may be associated with packaging one or more products for shipping, according to an embodiment of the disclosure. The example system 100 may include, but is not limited to, a computing device 120 to which a display device 130 and various input devices 150a-b, such as a scanner 150a and a keyboard 150b may be connected in wired (as shown) or wireless fashion. A user 102 may utilize the input devices 150a-b to communicate and/or interact with the computing device 120.

In an example embodiment, the computing device 120 may implement a product shipping software application that may facilitate packaging products or items, such as the products 110, for shipping or distribution. In one example, the user 102 may enter a hotkey, or command character, to manipulate the software application to display various menu options or perform various functions. For example, the user 102 may utilize the keyboard 150b to enter an 'l' or an 'e' command character to exit from a current screen or function of the software application, as examples. The software application may be a web page 132 (as shown), an ASCII display, other terminal display, or various other types of displayed output.

In another example, the user 102 may utilize a scanner 150a, such as a bar code scanner, to scan various bar codes to implement or facilitate the processes described herein. For example, the user 102 may scan a bar code 122 of the computing system 120 to authenticate the computing system such that the user may access the product shipping software application. The user 102 may also scan a packing slip (not shown) to receive a list of one or more items for packing (e.g., as shown on the web page 132). A bar code or other identifier associated with each item listed on the packing slip (e.g., the bar code 112 of a camera or other product 110) may also be scanned and inserted into a tote 104, to which a bar code 106 or other identifier may be affixed, in one embodiment. The user 102 may scan the bar code 106 to associate the one or more items listed on the packing slip with the tote 104. In some examples in which a single product or item is designated for shipping, the user 102 may scan a label 106 of a tote 104, and may subsequently scan a bar code 112 of a camera or other product 110, which may be indicated on a packing slip (not shown), prior to inserting the product 110 into the tote 104.

The above descriptions in FIG. 1 are for purposes of illustration and are not meant to be limiting. A different number and type of devices, including computing devices and input devices, may exist in other embodiments. Also, embodiments herein are not meant to be limited to packaging products for shipping. Numerous other functions and/or processes that may involve receiving information from input devices may exist in other embodiments herein.

Figure 2:
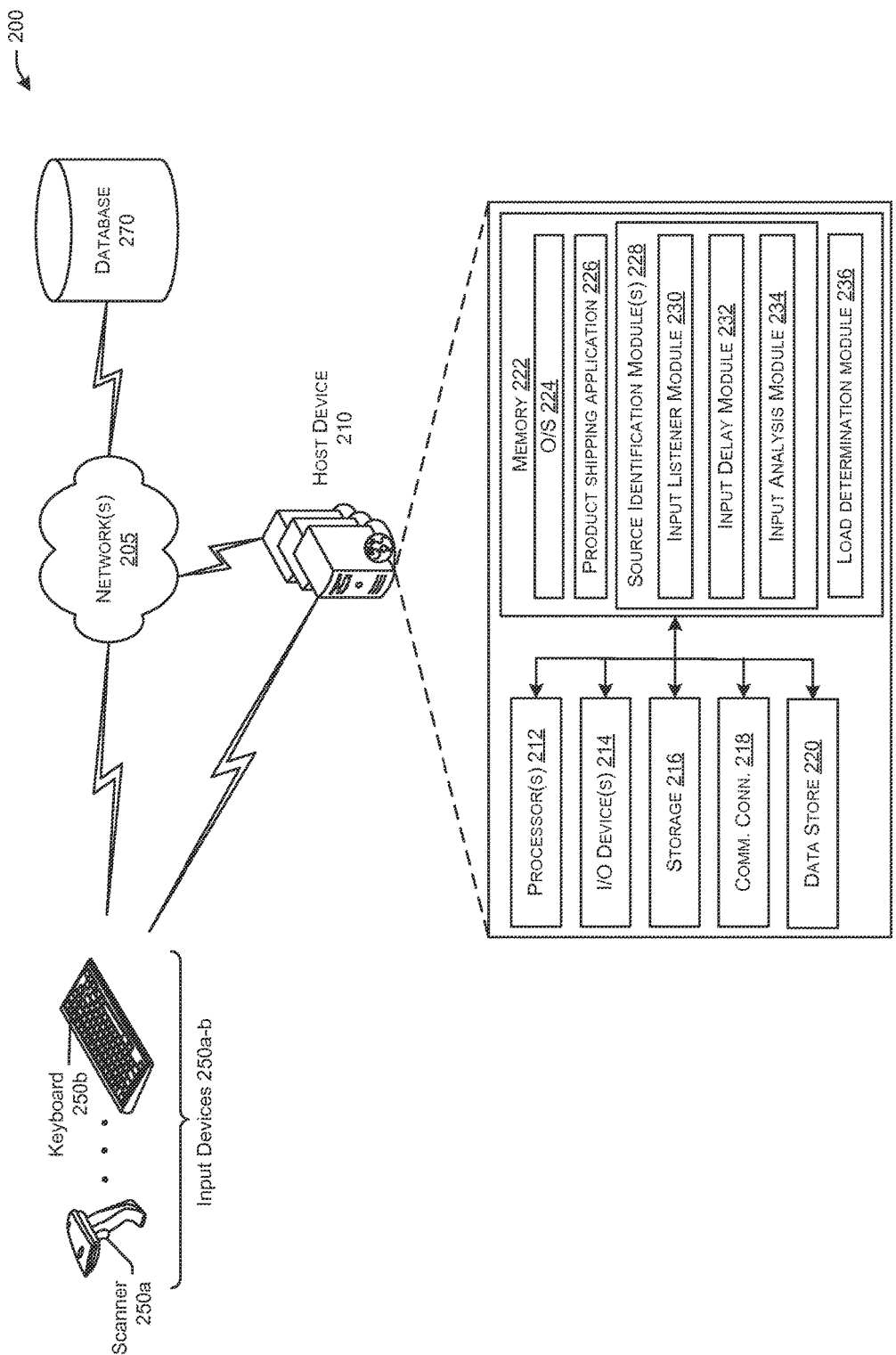
FIG. 2 illustrates a block diagram of an example computing environment for identifying a source of user input based on an input delay, according to an embodiment of the disclosure.

FIG. 2 depicts a block diagram of an example computing environment 200 for identifying a source of user input based on an input delay, according to an embodiment of the disclosure. The example computing environment 200 may include, but is not limited to, a host device 210, input devices 250a-b, and a database 270. Each of the devices in FIG. 2 may communicate with one another via a direct connection, or via the one or more networks 205, which may be wired or wireless networks. For example, a scanner device 250a may send bar code information associated with a product for shipping to the host device 210 via a direct connection or over the one or more networks 205. Also, the keyboard 250b may send information, such as a command character, to the host device 210 via a direct connection. The host device 210 may store at least a portion of the received information in a database 270. Numerous other communication examples may exist.

The above configuration in FIG. 2 is not meant to be limiting. In other embodiments, multiple host devices 210 and/or other computing devices may exist on the one or more networks 205. Such additional computing devices may communicate with the host device 210 and may further impact the efficiency or operation of the host device 210 on the network 205. In some embodiments, the host device 210 may not reside on a network, but may instead be connected directly to the input devices 250a-b and/or the database 270.

As used herein, the term "device" may refer to any component that includes one or more suitable processors that may be configured to execute computer-readable, computer-implemented, or computer-executable instructions. Example devices may include, but are not limited to, personal computers, server computers, digital assistants, personal digital assistants, wearable computers, digital tablets, scanners, application-specific circuits, microcontrollers, minicomputers, transceivers, Internet appliances, customer premise equipment such as set-top boxes, kiosks, or other processor-based devices. The execution of suitable computer-implemented instructions by one or more processors associated with various devices may form special purpose computers or other particular machines that may facilitate identifying a source of user input based on an input delay.

Certain embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, the distribution of software may be downloaded via the Internet.

The one or more networks 205 may include any number of wired or wireless networks that may enable various computing devices in the computing environment 200 to communicate with one another. In other embodiments, other networks, intranets, or combinations of different types of networks may be used including, but not limited to, the Internet, intranets, cable networks, cellular networks, landline-based networks, or other communication mediums connecting multiple computing devices to one another.

The devices in FIG. 2 may include one or more processors configured to communicate with one or more memory devices and various other components or devices. For example, the host device 210 may include one or more processors 212 that are configured to communicate with one or more memory or memory devices 222, one or more input/output (I/O) devices 214, storage 216, one or more communication connections 218, and one or more data stores 220. The processor 212 may be implemented as appropriate in hardware, software, firmware, or a combination thereof.

The memory 222 of the host device 210 may store program instructions that are loadable and executable on the processor 212, as well as data generated during the execution of these programs. Depending on the configuration and type of host device 210, the memory 222 may be volatile, such as random access memory (RAM), and/or non-volatile, such as read-only memory (ROM), flash memory, etc.

The storage 216 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the host device 210.

The memory 222 and the storage 216, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 222 may include multiple different types of memory, such as static random access memory (SRAM), dynamic random access memory (DRAM), or ROM.

The one or more communication connections 218 may allow the host device 210 to communicate with other devices, such as one or more of the input devices 250*a-b*, databases (e.g., the database 270), user terminals, and various other devices that may exist on the one or more networks 205. The communication connections 218 may include suitable hardware and software that enables or facilitates sending or receiving information to other devices on the network 205.

The I/O devices 214 may enable a user to interact with the host device 210. Such I/O devices 214 may include, but are not limited to, a keyboard, a scanner, a mouse, a pen, a voice input device, a touch input device, a display, a camera or imaging device, speakers, or a printer. In one embodiment, the I/O devices 214 may include at least the input devices 250*a-b*.

The data stores 220 may store lists, arrays, databases, flat files, etc. In some implementations, the data stores 220 may be stored in memory external to the host device 210 but may be accessible via the one or more networks 205, such as with a cloud storage service. The data stores 220 may store information that may facilitate identifying a source of user input based on an input delay. Such information may include, but is not limited to, one or more delay threshold values that may facilitate identifying a source of user input; a mapping of the one or more delay threshold values to current utilization or performance metrics at the host device 210; historical data associated with shipped products (e.g., the products 110 in FIG. 1), such as the time at which the products were scanned for shipping, information associated with a fulfillment center (FC) from which the products were shipped, etc.; and information used to authenticate the host device 210, such as a stored unique identifier of the host device 210 that may be compared to a unique identifier of the host device 210, which may be encoded on a bar code such as the bar code 122 in FIG. 1.

Turning to the contents of the memory 222, the memory 222 may store an operating system (O/S) 224, a product shipping application 226, and various software applications and/or modules that may implement or facilitate identifying a source of user input based on an input delay. Example modules may include, but are not limited to, a source identification module 228, and a load determination module 236. Each of these modules may be implemented as individual modules that provide specific functionality associated with the processes described herein. Alternatively, one or more of the modules may perform all or at least some of the functionality associated with the other modules.

The product shipping application 226 may provide one or more functions or features associated with identifying, packaging, and shipping a product or item, among other functions. A user may utilize the product shipping application 226 to activate and/or interact with such functions, as described above.

The source identification module 228 may include various program modules for implementing or facilitating the identification of a source of user input. Such program modules may include, but are not limited to, an input listener module 230, an input delay module 232, and an input analysis module 234.

The input listener module 230 may perform functions associated with capturing user input. One such function may include monitoring for information, such as one or more characters sent by the input devices 250*a-b*. For example, the input listener module 230 may monitor for information received over ports (e.g., a Universal Serial Bus (USB) port, a PS/2 port, etc.) or the communication connections 218, to each of which one or more of the input devices 250*a-b* may be connected and/or in wireless communication. In one embodiment, the input listener module 230 may include an interrupt handler for receiving keyboard input or other inputs. Various other handlers, program modules, etc., may exist in other embodiments.

The input listener module 230 may also receive information for which it monitors. Such information may include a single character, such as a hotkey or command character, received from a key press input device or other input device. The received information may also include a stream of multiple characters, such as data encoded in a bar code or similar identifier, which may be received from a data stream reader device or other input device. The received one or more characters may include ASCII characters, symbols, control characters, or generally any input that may be received and identified by the host device 210.

In certain embodiments herein, each character in a stream of characters may be separated from other characters in the stream by a time delay, as described above. The input listener module 230 may therefore receive each character in a stream of characters at a different time. The time delay between receipt of each character may differ. For example, an 8.0 ms time delay may exist between receipt of a first character in a stream and receipt of a second character in the stream, while an 11.0 ms delay may exist between receipt of the second character in the stream and a third character in the stream. Numerous other examples exist.

Upon receiving a character, the input listener module 230 may store the character in a memory, such as in a buffer of the memory 222, the data store 220, the database 270, or other storage. In one configuration, the input listener module 230 may store received characters in the storage area until it receives a null character, or a similar indicator that the end of a stream of multiple characters has been reached. The stored characters may be accessed by various program modules to facilitate the processes described herein. Examples of receiving, storing, and accessing characters will be described in greater detail below.

The input listener module 230 may also initiate, create, or otherwise start one or more threads for facilitating the processes described herein. The threads may run independently or concurrently with other processes at the host device 210. In one embodiment, the input listener module 230 may receive characters from the input devices 250*a-b* while the thread that the input listener module 230 initiated implements a delay until a threshold time is reached. Implementing such a delay may include incrementing a timer or counter until the threshold time is met. For example, if the threshold time is 100.0 ms, the thread may delay or wait 100.0 ms before taking any action, such as notifying the input listener module 230 that the threshold time has been reached, at which time other processes herein may determine the source of user input, or put another way, the type of input device from which user input was received. In this way, implementing a delay by the thread may mean delaying a determination of the source of the user input, according to one embodiment. The initiated thread may also determine the threshold time, as will be described in greater detail below. In one embodiment, the initiated thread may be the input delay module 232 in the memory 222 of the host device 210.

The input listener module 230 may initiate a thread, or the input delay module 232, in response to certain events. Such events may include, but are not limited to, receiving a character from an input device 250*a-b*, such as a command character or the first character of data encoded on a bar code or similar identifier.

As mentioned above, a threshold time for implementing the processes described herein may be determined by the input delay module 232. In one embodiment, the threshold time may be predetermined based on various factors. One such factor may include an expected time at which at least two characters will be received from an input device 250*a-b*, such as a data stream reader device. The expected time may be based on historical delay times associated with receiving characters from data stream reader devices. The historical delay times may indicate that at least two characters are received before 100.0 ms has elapsed after the first character of the at least two characters was received. According to this example, the threshold time may be 100.0 ms. Any threshold time greater than 0.0 ms may exist in other examples.

In other embodiments, the threshold time may be determined based at least in part on system utilization, load, network latency, or other performance indicators associated with the host device 210. Changes in such metrics may affect the rate at which characters are received by the input listener module 230. Adjustments to the threshold time may be made based at least in part on such changes, in some embodiments, as described in examples below. The load determination module 236 may make such determinations and adjustments, in certain embodiments herein.

In some embodiments, one or more system performance metrics may be determined by the load determination module 236 periodically, or at scheduled times for the host device 210, such as once every minute, five minutes, ten minutes, etc. Such metrics may also be determined upon the occurrence of certain events, such as the starting or ending of processes running at the host device 210; an increase in system utilization or load at the host device 210, which may be determined by executing various commands associated with the O/S 224 for determining load, utilization, network latency, or other performance at the host device 210.

In one example, the load determination module 236 may compare a current system load to a previous system load to determine any change in system load. If a change in system load is detected, then the threshold time may be adjusted based at least in part on the change in system load, in one example. Any number of adjustments may be made. For example, a percentage change in the system load may be applied to the threshold time. For example, if the system load increases 75%, which may adversely affect the rate at which characters are received from scanner device 250*a*, then a threshold time of 100.0 ms may be increased 75% to 175.0 ms. Such an increase may mean that the input delay module 232 may wait until 175.0 ms before a determination of the source of user input, or alternatively an identification of a type of the input device 250*a*, is performed by the input listener module 230 in one embodiment. Alternatively, if system load decreases, then the threshold time may be decreased by a percentage of the system load decrease, in another example. Numerous other example calculations or factors may be used to determine an adjustment based on system load, utilization, performance, etc., in other embodiments.

The threshold time may be stored and updated by the source identification module 228, in one embodiment. The threshold time may be stored in the memory 222, the data store 220, the database 270, or other storage where it may be accessed by the input delay module 232 such that it may determine when to stop implementing its delay. Put another way, the input delay module 232 may also increment a counter as time elapses. In this way, the input delay module 232 may track the amount of time that elapsed since it was initiated, for example, by the input listener module 230. The input delay module 232 may increment the counter until the threshold time is reached. After the threshold time is reached, the input delay module 232 may send an indication to the input analysis module 234 that the threshold time has been reached, in one embodiment.

The input analysis module 234 may determine the source or type of input device from which user input was received. Such a determination may be based at least in part on one or more characters received and stored by the input listener module 230, in one embodiment. In one aspect of the embodiment, an identification and number of the one or more characters may be determined to identify a source or type of the input device from which user input was received. To facilitate such a determination, the input analysis module 234 may receive an indication from the input delay module 232 that a threshold time has been met. After receiving the indication, the input analysis module 234 may analyze a memory buffer in which the one or more characters may be stored, in one embodiment.

In analyzing the memory buffer, the input analysis module 234 may determine whether the first character is a command character. In so doing, the input analysis module 234 may compare a received character to one or more stored command characters corresponding to respective functions associated with the product shipping software 226, in one embodiment. If a match exists between the received character and a stored command character, then the input analysis module 234 may determine that the first received character is a command character or hotkey. Thereafter, the input analysis module 234 may determine whether one or more additional characters were received before the threshold time was reached, or alternatively prior to the input analysis module 234 receiving an indication that the threshold time has been reached. If so, then the input analysis module 234 may determine that the source of the input device from which the user input was received is a data stream reader device, such as the scanner 250*a*. One or more additional characters from the data stream reader device may be received after the threshold time was reached in such instances.

If the input analysis module 234 determines that a command character was the only character received before the threshold time is reached, the input analysis module 234 may determine that the type of input device from which the user input was received is a key press input device, such as a keyboard 250*b*. If a command character was not the first character received, then the input analysis module 234 may determine that the type of input device from which the user input was received is a data stream reader device, in certain embodiments herein. A more detailed example of such determinations is provided below.

The input analysis module 234 may also perform various functions after determining the type of input device from which user input was received. One such function may include activating a menu item or other function that corresponds to a hotkey selected by a user. For example, if a user enters an "e" to exit the packaging software application, then the input analysis module 234 may call a function to exit the user from the software application. As another example, upon determining that the source of user input is a bar code scanner, the input analysis module 234 may store the received characters, which may correspond to a bar code identifier or similar identifier associated with a product or item for shipping, a tote in which the product or item may be inserted, and/or an identification of the host device 210 in communication with the input devices 250a-b. Any number and type of other functions may be performed after determining the type of input device from which user input was received.

The above embodiments and descriptions in FIG. 2 are for purposes of illustration and are not meant to be limiting. Other modules, threshold time determinations, input devices 250a-b, number of host devices 210, number and functionality of the program modules associated with the host device 210, etc., may exist. For example, all or at least a portion of the functionality described above may be performed by one or more of the program modules. In some embodiments, the source identification module 228 may communicate with each of the program modules 230, 232, 234, and 236 to facilitate the processes described herein. For example, the source identification module 228 may initiate the input listener module 230, may initiate a thread (e.g., the input delay module 232) upon receiving an indication from the input listener module 230 that a first character that matches a hotkey has been received, and may initiate the input analysis module 234 to determine a type of the input device from which user input was received after receiving an indication from the input delay module 232 that a threshold time has been reached. Numerous other examples of communications between the program modules in the memory 222 may exist.

Figure 3A:
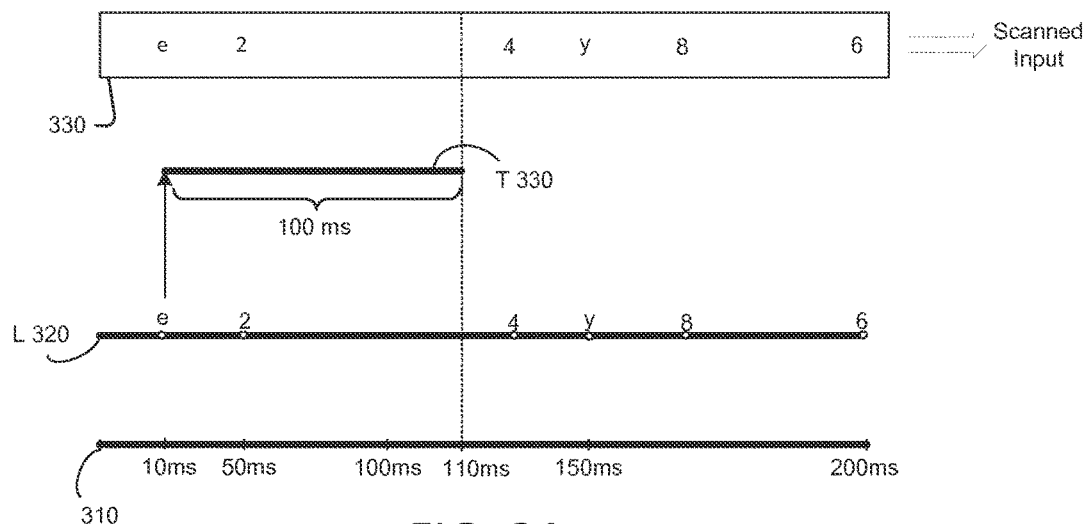
FIGS. 3A and 3B illustrate example diagrams for determining the source of user input based on an input delay, according to certain embodiments of the disclosure.
Figure 3B:
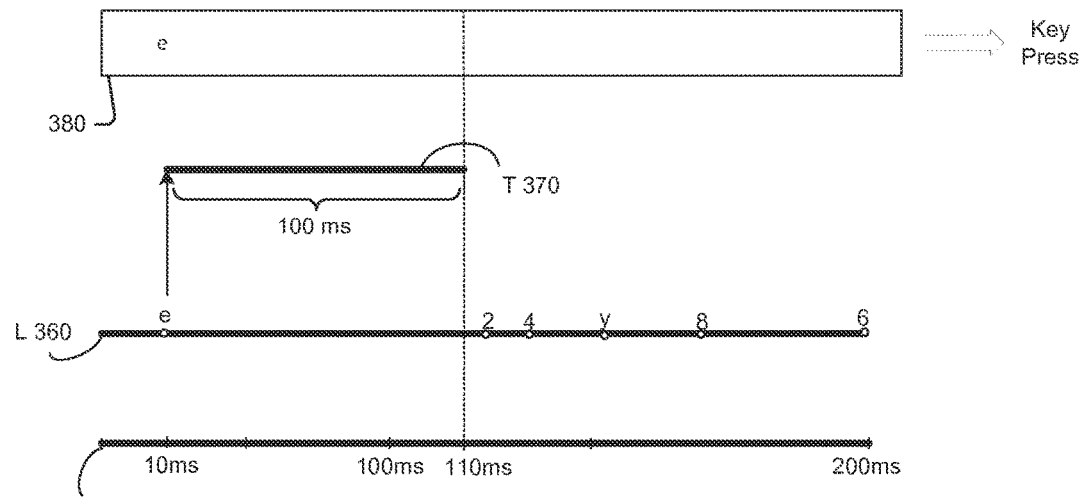

FIGS. 3A and 3B depict example diagrams for determining the source of user input based on an input delay, according to certain embodiments of the disclosure. Such a determination may be performed by a host device, such as the host device 210 in FIG. 2. As shown in FIG. 3A, a listener L 320 may monitor and receive one or more characters over a time period, such as the time period indicated on the timeline 310. Characters may be received (e.g., from an input device 250a-b in FIG. 2) at different time intervals and subsequently stored in a buffer 330 in a memory. For example, a character "e" may be received at 10.0 ms and stored in the buffer 330, as shown.

After the character "e" is received, the listener L 320 may initiate a thread T 330, which may implement a delay until a threshold time is reached. Put another way, the thread T 330 may increment a timing delay or a counter until a certain amount of time has elapsed. In the present example, the threshold time may be 100.0 ms, as shown. The thread T 330 may therefore increment a counter or otherwise delay a determination of the source of user input until 100.0 ms has elapsed, in one embodiment. Such a determination may be delayed until 110.0 ms is reached in the present example, which is 100.0 ms after the thread T 330 was initiated at 10.0 ms.

During the 100.0 ms delay period of the thread T 330, the listener L 320 may receive additional characters, such as the character "2" indicated as being received at 50.0 ms. The character "2" may be subsequently stored in the buffer 330 such that the buffer 330 includes received characters "e" and "2," as shown. Such characters, when stored together, may also be expressed as a stream of characters, a string, text, a concatenation of characters, etc.

After the threshold time of 100.0 ms is reached, the buffer 330 may be analyzed to determine a source or type of input device from which the characters "e" and "2" were received. The dotted line in FIG. 3A indicates a point in time at which the buffer 330 is accessed, such time corresponding to the threshold time. Characters to the left of the dotted line passing through the buffer 330 may include characters that were before the threshold time was reached (or up to and including the threshold time in some embodiments). In the present example, a determination may be made that the type of the input device from which the "e" and "2" characters were received is a data stream reader device, such as a bar code scanner, because at least two characters were received before the threshold time was reached.

In other embodiments, the characters received before the threshold time is reached may be compared to a list of hotkeys, which may be one or more characters. If a match is determined between one or more characters received before the threshold time is reached and a stored hotkey, then the received one or more characters may be determined to be a hotkey or command character. After such a determination is made, the buffer 330 in which the hotkey is stored may be cleared, and an action associated with the hotkey may be invoked. If a determination is made that the received one or more characters is not a hotkey, then additional characters may be received, such as those characters shown to the right of the dotted line in the buffer 330, until a null or end of data character is reached. In such an instance, a determination may be made that the type of the input device from which the characters were received is a data stream reader device, and a subsequent action (e.g., storing the received information in a database or other data store) may be performed.

In the present example, a determination may be made that the string "e2" is not a hotkey. Thereafter, any remaining characters associated with input from an input device, such as characters associated with a bar code or other identifier, may be received. Such characters are shown as stored to the right of the dotted line in the buffer 330 in FIG. 3A and are indicated as "4," "y," "8," and "6" in the present example, each of which were received and stored at different times after the threshold time, as shown.

FIG. 3B illustrates another example of determining a source of user input. A listener L 360 may monitor and receive one or more characters over a time period, such as the time period indicated on the timeline 350. A character "e" may be received at 10.0 ms and stored in the buffer 380, as shown. When the thread T 370 reaches a threshold time, the buffer 380 may be analyzed to determine the source of the one or more characters. In the present example, the received character "e" may be compared to a stored list of hotkeys to determine if a match exists. If a match exists, then it may be determined that a hotkey was received, and an action that corresponds to the hotkey may be performed. The buffer 380 in which the received one or more characters were received may also be cleared. In the present example, the character "e" matches a hotkey. After the threshold time of approximately 100.0 ms has been met, the buffer 380 may be cleared, and the user may exit the packaging software application, in an example embodiment. As shown, additional characters "2," "4," "y," "8," and "6" may be received after the threshold time has been reached. Such characters may not impact a determination that a command character has been received (e.g., "e") because the characters were received after the threshold time was reached, in one embodiment.

The above descriptions in FIGS. 3A and 3B are for purposes of illustration and are not meant to be limiting. Variations may exist in other embodiments. For example, characters other than "e" and "1" may be hotkeys. One or a combination of other characters may also be hotkeys. Also, a different threshold time and duration for monitoring for characters as shown on the timelines 310 and 350 may exist.

Figure 4:
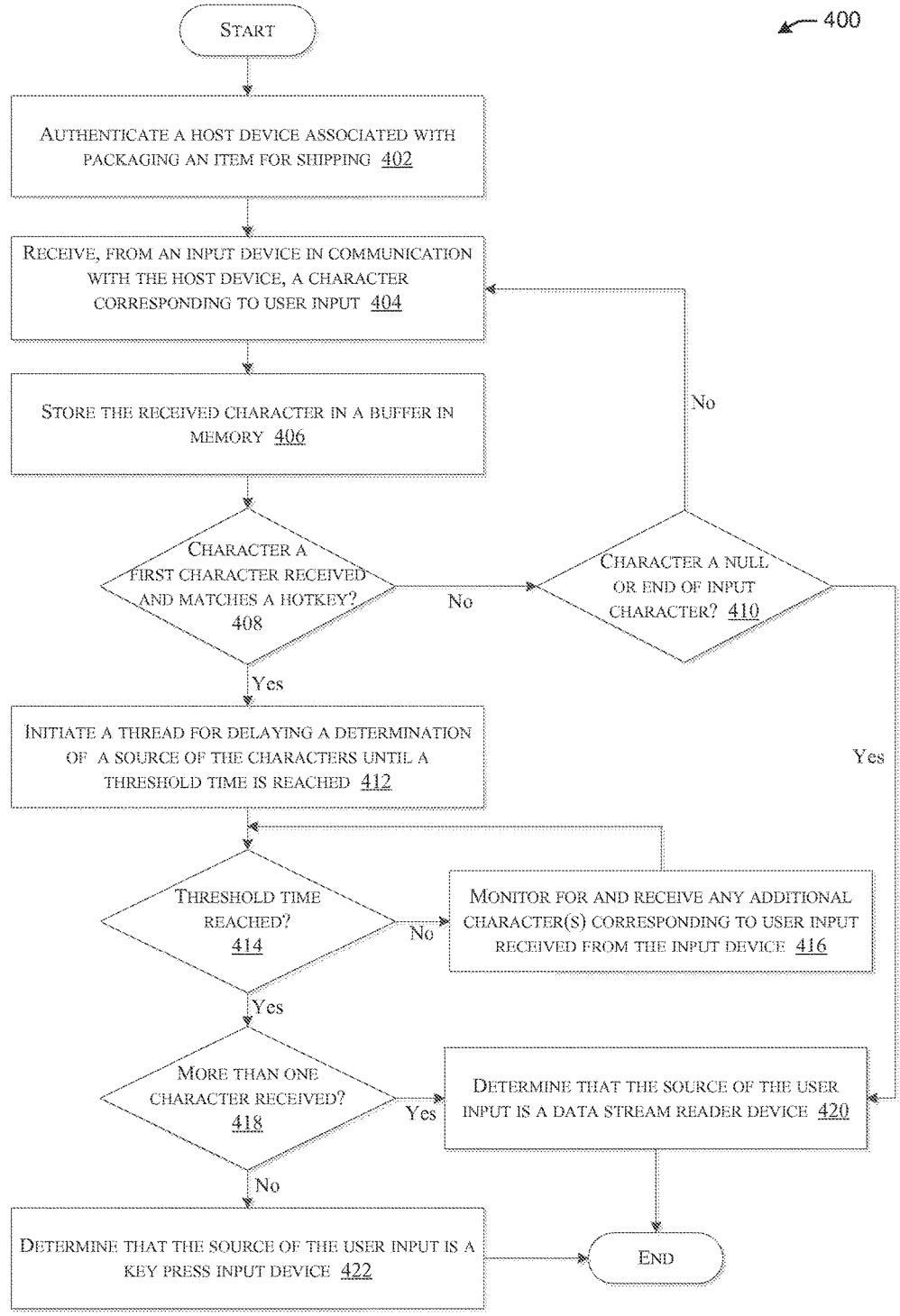
FIG. 4 illustrates a flow diagram of an example process for identifying a source of user input based on an input delay, according to an embodiment of the disclosure.

FIG. 4 depicts a flow diagram of an example process 400 for identifying a source of user input based on an input delay, according to an embodiment of the disclosure. In one embodiment, the example process 400 may be implemented by the host device 210 in FIG. 2. The example process 400 may begin at block 402, where a host device may be authenticated (e.g., by the source identification module 228 prior to permitting the host device to access a software application to implement or facilitate packaging items for distribution. Such authentication may include validating a unique identifier associated with the host device. In one embodiment, the unique identifier may be scanned via a scanner device in communication with the host device. The host device may compare the unique identifier to a stored list of valid identifiers to determine whether the host device may access the packaging software application.

At block 404, a character corresponding to user input may be received (e.g., by the input listener module 230) from an input device in communication with the host device. Such input devices may include key press input devices or data stream reader devices, among other input devices. Example key press input devices may include, but are not limited to, keyboards, keypads, or other devices that enable a user to enter a single character for transmission to a computing device to which the input device is connected. Example data stream reader devices may include, but are not limited to, bar code scanners, magnetic stripe card readers, or other devices that may read a stream or string of characters upon the user performing an action (e.g., scanning a bar code, swiping a card, etc.) to capture such characters. The received characters may be stored, for example, in a memory, data store, database, or other storage (e.g., by the input listener module 230), at block 406.

A determination may be made whether the first character received matches a hotkey (e.g., via the input listener module 230) at block 408. The determination may be performed by comparing the first received character to a stored list of hotkeys to determine whether a match exists, and consequently that the first received character is a hotkey. If the first character received does not match a hotkey at block 408, then processing may return to block 404 via block 410, where any next characters associated with an input device may be monitored and received, for example, until a null character or similar end of input indication has been received at block 410. Then, it may be determined that the source of the user input is a data stream reader device, at block 420.

At block 412, if the first character matches a hotkey, then a thread may be initiated (e.g., by the input listener module 230) to facilitate delaying a determination of a source of the received input characters until a threshold time is reached. The initiated thread may be the input delay module 232, in one embodiment. Such a threshold time may be established and determined according to techniques described above. For example, the threshold time may be adjusted based on a system utilization or load associated with the host device, as determined by the load determination module 236, in one embodiment.

Monitoring and receipt of any additional characters from an input device may continue at block 416 until the threshold time is reached, in one embodiment. If the threshold time is reached at block 414, then identification of the source of user input may be determined (e.g., by the input analysis module 234). In one embodiment, such identification may be based at least in part on the number of characters received before the threshold time is reached, as may be determined at block 418. For example, if only one character has been received, and such a character is a hotkey as determined above, then it may be determined that the source of user input is a key press input device, at block 422. If more than one character has been received, then it may be determined that the source of user input is a data stream reader device, at block 420.

The operations and processes described and shown above may be carried out or performed in any suitable order as desired in various implementations. Additionally, in certain implementations, at least a portion of the operations may be carried out in parallel. Furthermore, in certain implementations, less than or more than the operations described above may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   monitoring, by a host device, for one or more characters corresponding to user input associated with an input device;
   receiving, by the host device from the input device, the one or more characters corresponding to the user input;
   storing, by the host device, the one or more characters in a buffer in memory;
   determining, by the host device, a first character of the one or more characters is a command character for causing the host device to perform at least one function;
   initiating, by the host device, based on the first character, a delay process, wherein the host device continues at least the monitoring, the receiving, and the storing of the one or more characters while the delay process is being implemented;
   adjusting, by the host device, a predefined threshold time based on historical delays associated with receiving characters from the input device;
   determining, by the host device, based on the predefined threshold, that the source of the user input is a key press input device when only one character that matches the command character is in the buffer; and
   determining, by the host device, based on the predefined threshold, that the source of the user input is a data stream reader device when more than one character is in the buffer.

2. The method of claim 1, wherein when the determined source of the user input is a data stream reader device, at least one additional character of the one or more monitored characters is received while the delay process was being implemented.

3. The method of claim 1, wherein when the first character is not the command character:
   receiving, by the host device, one or more additional characters; and
   determining, by the host device, that the source of the input device is a data stream reader device.

4. The method of claim 1, wherein the key press input device comprises a keyboard, and wherein the at least one function caused by the command character comprises a user selecting a function associated with a product to be shipped.

5. The method of claim 1, wherein the data stream reader device comprises a scanner device, and wherein the characters in the buffer correspond to at least a portion of a bar code label associated with shipping a product.

6. One or more non-transitory computer-readable media storing computer-executable instructions that, when executed by at least one processor, configure the at least one processor to perform operations comprising:
   receiving, from an input device, one or more characters corresponding to user input;
   determining that a first character of the one or more characters matches a command character for causing performance of at least one function;
   initiating a delay process, based on the first character;
   adjusting, by the host device, a predefined threshold time based on historical delays associated with receiving characters from the input device; and
   determining a type of the input device based at least in part on a number of the one or more characters received and based on the predefined threshold time.

7. The one or more non-transitory computer-readable media of claim 6, the at least one processor further configured to perform the operations comprising:
   determining that the type of the input device is a key press input device when the number of the one or more characters received is one.

8. The one or more non-transitory computer-readable media of claim 7, wherein the key press input device comprises a keyboard, and wherein the at least one function caused by the command character comprises a user selecting a function associated with shipping a product.

9. The one or more non-transitory computer-readable media of claim 6, the at least one processor further configured to perform the operations comprising:
   determining that the type of the input device is a data stream reader device when the number of the one or more characters received is more than one.

10. The one or more non-transitory computer-readable media of claim 9, wherein the data stream reader device comprises a scanner device, and wherein the one or more characters received correspond to at least a portion of a bar code label associated with a product to be shipped.

11. The one or more non-transitory computer-readable media of claim 9, the at least one processor further configured to perform the operations comprising:
   after the predefined threshold time is reached, receiving one or more additional characters;
   invoking a function associated with shipping a product, wherein the one or more characters received before the predefined threshold time is reached and the one or more additional characters correspond to an identifier for the product or a tote for enclosing the product; and
   clearing a buffer in which the characters are stored.

12. The one or more non-transitory computer-readable media of claim 6, the at least one processor further configured to perform the operations comprising:
   receiving at least one second character while the delay process is being implemented; and
   determining that the type of input device is a data stream reader device based at least in part on the receiving of the at least one second character.

13. The one or more non-transitory computer-readable media of claim 6, wherein the predefined threshold time is predetermined based at least in part on historical data associated with receiving the one or more characters from the input device.

14. The one or more non-transitory computer-readable media of claim 6, wherein the predefined threshold time is based at least in part on at least one of utilization, load, or network latency associated with the at least one processor.

15. A system comprising:
   a first input device;
   a second input device;
   at least one memory that stores computer-executable instructions; and
   at least one processor in communication with the first input device and the second input device, wherein the at least one processor is configured to access the at least one memory, and wherein the at least one processor is configured to execute the computer-executable instructions to at least:
      receive one or more characters from the first input device;
      store the one or more characters in a buffer in memory;
      determine that a first character of the one or more characters matches a command character for causing performance of at least one function;
      initiate a first delay process, based on the first character, wherein the at least one processor continues at least the receiving and the storing of the one or more characters while the first delay process is being implemented;
      adjust a predefined threshold time based on historical delays associated with receiving characters from the input device;
      determine based on the predefined threshold that the one or more characters in the buffer comprise more than one character; and
      determine based on the predefined threshold that a type of the first input device is a data stream reader device based at least in part on the determination that the one or more characters in the buffer comprise more than one character.

16. The system of claim 15, wherein the at least one processor is further configured to execute the computer-executable instructions to:
   receive one or more characters from the second input device;
   store the one or more characters from the second input device in a buffer in memory;
   determine that a first character of the one or more characters from the second input device matches a command character for causing performance of at least one function;
   initiate a second delay process until a second predefined threshold time is reached, wherein the at least one processor continues at least the receiving and the storing of the one or more characters while the second process delay is being implemented; and
   when the second predefined threshold time is reached:
      determine that the one or more characters from the second input device in the buffer comprises only one character; and
      determine that a type of the second input device is a key press input device based at least in part on the determination that the one or more characters from the second input device in the buffer comprise only one character.

17. The system of claim 16, wherein the key press input device comprises a keyboard, and wherein the at least one function caused by the command character comprises a user selecting a function associated with a product to be shipped.

18. The system of claim 15, wherein the data stream reader device comprises a scanner device, and wherein the one or more characters in the buffer correspond to at least a portion of a bar code label associated with shipping a product.

19. The system of claim 16, wherein the first and second threshold times are predetermined based at least in part on historical data associated with receiving the one or more characters from the first and second input devices or based at least in part on at least one of utilization, load, or network latency associated with the at least one processor.

20. The system of claim 15, the at least one processor being further configured to execute the computer-executable instructions to:
   monitor the first input device and the second input device for one or more respective characters associated with user input.

* * * * *